(12) United States Patent
Suzuki et al.

(10) Patent No.: US 9,261,048 B2
(45) Date of Patent: Feb. 16, 2016

(54) COMBUSTION GAS SUPPLY CONTROL DEVICE

(75) Inventors: Tasuku Suzuki, Tokyo (JP); Chiyako Mihara, Tokyo (JP); Katsunori Ieki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 746 days.

(21) Appl. No.: 13/546,253

(22) Filed: Jul. 11, 2012

(65) Prior Publication Data

US 2013/0014491 A1 Jan. 17, 2013

(30) Foreign Application Priority Data

Jul. 14, 2011 (JP) ................................. 2011-156128

(51) Int. Cl.
| | | |
|---|---|---|
| *B63H 11/00* | (2006.01) | |
| *F02K 9/28* | (2006.01) | |
| *F02K 9/12* | (2006.01) | |
| *F02K 9/38* | (2006.01) | |

(52) U.S. Cl.
CPC ... *F02K 9/28* (2013.01); *F02K 9/12* (2013.01); *F02K 9/38* (2013.01)

(58) Field of Classification Search
CPC ............... F02K 9/00; F02K 9/08; F02K 9/10; F02K 9/12; F02K 9/26; F02K 9/28; F02K 9/38; F02K 9/94; F02K 9/95
See application file for complete search history.

(56) References Cited

U.S. PATENT DOCUMENTS

| | | | | |
|---|---|---|---|---|
| 3,000,306 A | * | 9/1961 | Wenzel et al. ................. | 60/201 |
| 3,158,061 A | * | 11/1964 | Lager .............................. | 60/250 |
| 3,354,647 A | * | 11/1967 | Aycock .......................... | 60/220 |
| 3,688,700 A | * | 9/1972 | Arthur ........................... | 102/380 |
| 4,594,945 A | * | 6/1986 | Alexandris ..................... | 102/287 |
| 4,891,938 A | * | 1/1990 | Nagy et al. ..................... | 60/245 |

(Continued)

FOREIGN PATENT DOCUMENTS

| | | |
|---|---|---|
| EP | 2 503 135 | 9/2012 |
| JP | 2-237900 | 9/1990 |
| JP | 10-339213 | 12/1998 |

(Continued)

OTHER PUBLICATIONS

Japanese Office Action issued Jul. 22, 2013 in corresponding Japanese Patent Application No. 2011-156128 with English translation of relevant portion.

(Continued)

*Primary Examiner* — Gerald L Sung
(74) *Attorney, Agent, or Firm* — Wenderoth, Lind & Ponack, L.L.P.

(57) ABSTRACT

A combustion gas generator has: a motor case; a first propellant loaded within the motor case to burn at a first pulse; a second propellant loaded within the motor case to burn at a second pulse subsequent to the first pulse; a front motor head fixed to a front portion of the motor case and having a combustion gas exhaust hole; and a rear motor head fixed to a rear portion of the motor case and having a combustion gas exhaust hole. A combustion gas supply control device prevents combustion gas of the first propellant at the first pulse from flowing into the combustion gas exhaust hole of the front motor head and supplies combustion gas of the second propellant at the second pulse to the combustion gas exhaust hole of the front motor head.

16 Claims, 18 Drawing Sheets

(56) References Cited

U.S. PATENT DOCUMENTS

| | | | |
|---|---|---|---|
| 5,600,946 A * | 2/1997 | Dombrowski et al. | ......... 60/253 |
| 2010/0218481 A1 | 9/2010 | Mihara et al. | |

FOREIGN PATENT DOCUMENTS

| | | |
|---|---|---|
| JP | 2000-8957 | 1/2000 |
| JP | 3231778 | 11/2001 |
| JP | 2003-222500 | 8/2003 |
| JP | 2005-171970 | 6/2005 |
| JP | 2008-280967 | 11/2008 |
| JP | 4719182 | 7/2011 |
| WO | 95/30084 | 11/1995 |

OTHER PUBLICATIONS

Japanese Decision to Grant a Patent issued Jul. 22, 2014 in corresponding Japanese Patent Application No. 2011-156128 with English translation.

Japanese Office Action issued Jan. 30, 2014 in corresponding Japanese Patent Application No. 2011-156128 with English translation.

* cited by examiner

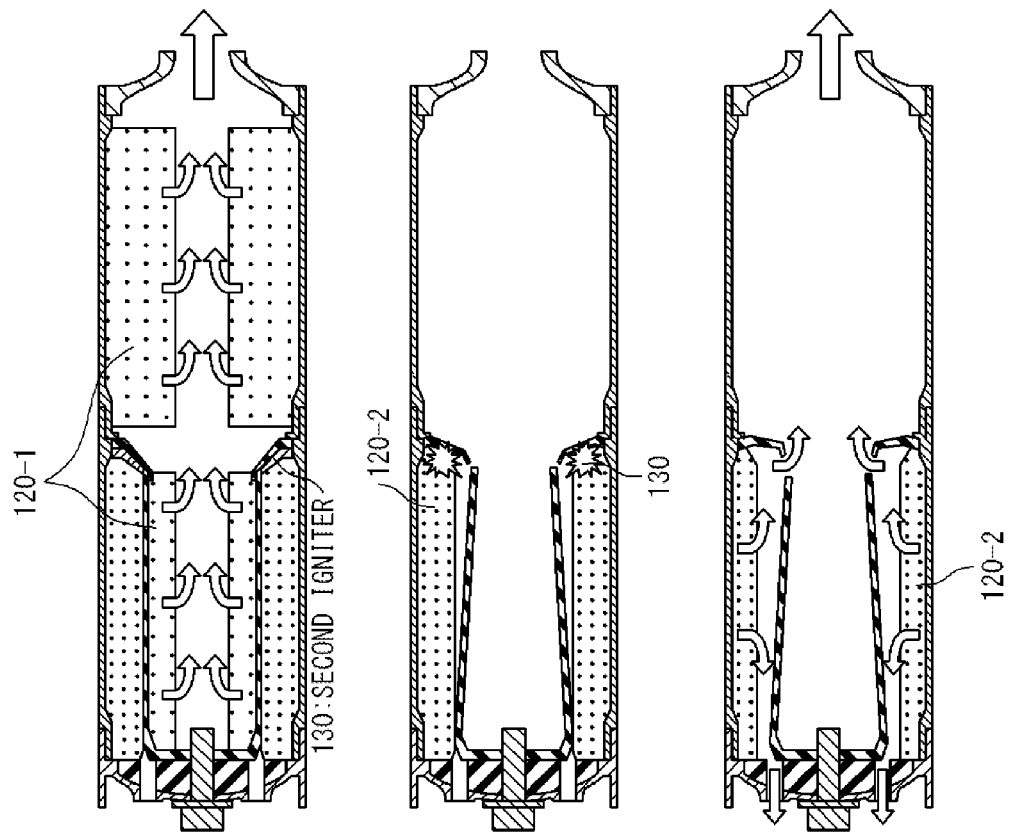
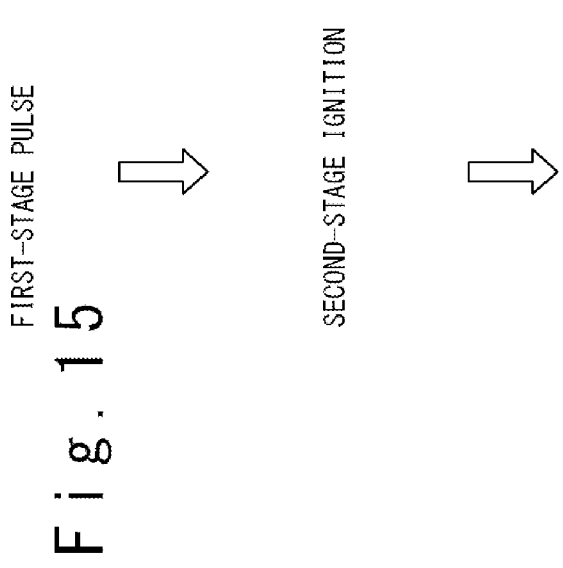
Fig. 15

COMBUSTION GAS SUPPLY CONTROL DEVICE

INCORPORATION BY REFERENCE

This application is based upon and claims the benefit of priority from Japanese patent application No. 2011-156128, filed on Jul. 14, 2011, the disclosure of which is incorporated herein in its entirety by reference.

BACKGROUND OF THE INVENTION

1. Field of the Invention

The present invention relates to a combustion gas supply control device.

2. Description of Related Art

In operating a missile, high mobility at the terminal guidance is required. One approach is to use a multi-pulse rocket motor and activate an appropriate pulse at the terminal guidance to reaccelerate the missile. For example, in operating a missile equipped with a two-pulse rocket motor, the missile is flown toward a target by being accelerated by a first pulse (combustion of a first propellant) and then the missile is reaccelerated by a second pulse (combustion of a second propellant) when coming close to the target, to enhance high mobility at the terminal guidance. Therefore, when aiming at a remote target, it is necessary to increase the amount of the first propellant consumed in the first pulse in order to increase either burn time or thrust, or both the burn time and thrust.

However, in a case of a two-pulse rocket motor disclosed in Patent Document 1 (Japanese Patent No. 3231778) and Patent Document 2 (Japanese Patent Publication JP-2005-171970), the first propellant and the second propellant are arranged in an axial direction of the rocket motor and also there is a limit to a length of the rocket motor in terms of equipment or storage. Therefore, the first propellant cannot have enough length. In this case, it is highly possible that an initial burning area becomes small and thus necessary initial thrust cannot be obtained.

Moreover, as for a barrier membrane and a barrier membrane holder of the two-pulse rocket motor disclosed in Patent Document 1 and Patent Document 2, breakability and durability of the barrier membrane at the time when a second igniter operates are unclear. When a barrier membrane is broken at an unintended position, combustion of the second propellant or a combustion gas flow is disturbed. In some cases, a nozzle may be blocked up with the broken barrier membrane.

In a case where the first igniter and the second igniter are arranged in series in the axial direction of the rocket motor disclosed in Patent Document 2, the igniters have cantilever long and thin structure. Therefore, the structure needs to be strengthened in order to secure the strength of the igniters against such environment as vibration at the time of operation. This causes increase in structural weight, which is unsuitable for a long rocket motor.

The inventors of the present application have proposed, in Patent Document 3 (Japanese Patent No. 4719182), a two-pulse rocket motor which can solve the problems of the techniques disclosed in Patent Document 1 and Patent Document 2. The two-pulse rocket motor disclosed in Patent Document 3 will be described below.

FIG. 1 is a longitudinal sectional view showing an example of the two-pulse rocket motor disclosed in Patent Document 3. FIG. 2 is a sectional view taken along a line A-A in FIG. 1.

The two-pulse rocket motor generates two-step thrust by first combusting a first propellant 4 and then, after a certain period of time has passed, combusting a second propellant 5. Therefore, the second propellant 5, until starting to be burned, needs to withstand high-temperature combustion gas and high pressure generated as a result of combustion of the first propellant 4.

As shown in FIGS. 1 and 2, a nozzle 2 having an exhaust hole 12 at the center for exhausting the combustion gas is fixed to a rear portion of a cylindrical motor case 1. A motor head 3 is fixed to a front portion of the motor case 1, and a first igniter 6 for combusting the first propellant 4 is fixed to the motor head 3.

The first propellant 4 and the second propellant 5 both in a hollow tubular shape (i.e. an internal-burning type propellant shape or an internal-end-burning type propellant shape) are loaded within the motor case 1. The second propellant 5 is arranged on an outer periphery of a front portion of the first propellant 4. It should be noted that the shape of the first propellant 4 and the second propellant 5 each may be a hollow cylinder, a hollow tube with a polygonal outer surface and/or a polygonal inner surface, or a hollow cone.

The first propellant 4 and the second propellant 5 are isolated from each other by a barrier membrane 10. A highly heat-resistant rubber such as EPDM rubber, silicone rubber, silicone rubber or EPDM rubber containing such inorganic fiber as Kevlar fiber can be used as the barrier membrane 10.

A second igniter 8 for combusting the second propellant 5 is provided at a forward end of the second propellant 5.

An operation of the two-pulse rocket motor shown in FIGS. 1 and 2 is as follows. The first igniter 6 starts operating in response to an external signal and hence the first propellant 4 starts burning (combusting). At this point of time, the barrier membrane 10 is not exposed to high-temperature combustion gas. After that, when the first propellant 4 has been combusted to the position of the barrier membrane 10, the barrier membrane 10 is exposed to high-temperature combustion gas. After a certain period of time has passed from completion of combustion of the first propellant 4, the second igniter 8 starts operating in response to an external signal and hence the second propellant 5 starts burning (combusting).

According to the two-pulse rocket motor shown in FIGS. 1 and 2 as described above, an inner surface of the first propellant 4 is exposed to a burning region 11 over almost the full length of the motor case 1 in the axial direction, and thereby an initial burning area can be secured. Therefore, there is no need to provide the inner surface of the first propellant 4 with a large slit.

Moreover, since the second propellant 5 is arranged on the outer periphery of the first propellant 4, a burning area of the second propellant 5 does not become extremely smaller than a burning area of the first propellant 4. Therefore, the nozzle 2 can be shared by the first propellant 4 and the second propellant 5.

In addition, since the second propellant 5 is arranged on the outer periphery of the first propellant 4 and the barrier membrane 10 is provided between the first propellant 4 and the second propellant 5, a time during which the barrier membrane 10 is exposed to the high-temperature combustion gas can be shortened as much as possible. In other words, heat protection of the barrier membrane 10 is achieved.

Furthermore, heat protection of the second igniter 8 is achieved by the barrier membrane 10 as in the case of the second propellant 5. The second igniter 8 is burned down due to its operation as expected.

It should be noted that an initial burning surface of the second propellant 5 means a surface which burns from an initial stage when the second propellant 5 starts burning, namely, a surface which is first exposed to the burning region 11 when the second propellant 5 starts burning. In the case of the example shown in FIG. 1, the initial burning surface of the second propellant 5 includes a cylindrical inner surface and a ring-shaped rear surface of the second propellant 5.

FIG. 3 is a longitudinal sectional view showing another example of the two-pulse rocket motor disclosed in Patent Document 3. FIG. 4 is a sectional view taken along a line B-B in FIG. 3.

In the example shown in FIGS. 3 and 4, the barrier membrane 10 is divided into two parts to provide a weak section (joint section). More specifically, the barrier membrane 10 covering the second propellant 5 comprises: an aft barrier membrane 10a in a circular truncated cone shape placed on a rear surface of the second propellant 5; and an inner barrier membrane 10b in a tubular shape placed on the inner surface of the second propellant 5. Respective ends of the aft barrier membrane 10a and the inner barrier membrane 10b are bonded with each other by a fire-resistant adhesive over an entire periphery, to serve as the weak section. The weak section (joint section) is not broken during combustion of the first propellant 4 but is certainly broken by pressure of gas generated by the operation of the second igniter 8 or combustion of the second propellant 5.

FIG. 5 is a longitudinal sectional view showing a deformation state of the barrier membrane 10 at the time of combustion of the second propellant 5. FIG. 6A is a sectional view taken along a line C-C in FIG. 5. FIG. 6B is a sectional view taken along a line D-D in FIG. 5.

At the time of combustion of the second propellant 5, the inner barrier membrane 10b, which is a large part of the barrier membrane 10, is deformed toward the center of the motor case 1 and is held at the forward portion of the motor case 1 where a combustion gas flow of the second propellant 5 is relatively slow. Meanwhile, a break portion of the aft barrier membrane 10a is deformed to be turned up backward along the combustion gas flow. Therefore, such an effect as breakability and durability of the barrier membrane 10 (the aft barrier membrane 10a and the inner barrier membrane 10b) become clear and certain and can be obtained in addition to the above-mentioned effects.

It should be noted that the same effects as in the case of the above-mentioned divided structure can be obtained even when the barrier membrane 10 is formed integrally and a cutoff line or a notch is provided at a position to be broken.

The second igniter 8 may be placed at a rearward end surface of the second propellant 5 that is closer to the weak section (joint section) of the barrier membrane 10 (the aft barrier membrane 10a and the inner barrier membrane 10b). In this case, certainty of breakage of the barrier membrane 10 (the aft barrier membrane 10a and the inner barrier membrane 10b) becomes higher.

In the case of the two-pulse rocket motor as described above, the second igniter 8 and the first igniter 6 are independent of each other across the barrier membrane 10, in terms of structure. Therefore, it is possible to secure the strength of the igniters against such environment as vibration at the time of operation, without strengthening the structure of the igniters to increase structural weight even in a case of a long motor.

CITATION LIST

[Patent Document 1] Japanese Patent No. 3231778
[Patent Document 2] Japanese Patent Publication JP-2005-171970
[Patent Document 3] Japanese Patent No. 4719182

SUMMARY

In operating a missile, it is required to secure high mobility at the terminal guidance. One approach is to use a multi-pulse rocket motor and activate an appropriate pulse at the terminal guidance to reaccelerate the missile, as described above. At the same time, it is often required to modify a trajectory of the missile by using a thruster.

A typical thruster has: a nozzle having a combustion gas exhaust hole; and an actuator that turns ON/OFF supply of combustion gas to the nozzle. A plurality of nozzles are arranged to arbitrary directions. The thruster performs trajectory control and attitude control for the missile by exhausting appropriate amount of combustion gas from a selected nozzle.

There are two methods for equipping the missile with the thruster. One is to fix the thruster to a combustion gas generator and equip the missile with the combustion gas generator (this type is hereinafter referred to as a separated thruster type). The other is to fix the thruster directly to a rocket motor (this type is hereinafter referred to as an unseparated thruster type). In a case of an operation where the rocket motor is detached from the missile after combustion is completed, the separated thruster type is preferably adopted. However, in a case of an operation where the rocket motor is not detached from the missile, the separated thruster type causes increase in a structural weight due to two motor cases, which deteriorates acceleration performance of the missile. Therefore, it is desirable to adopt the unseparated thruster type. It should be noted that there have been few actual example of the unseparated thruster type in operating the missile.

In the case where the unseparated thruster type is adopted, the thruster directly fixed to the rocket motor is exposed for a long time (even when the thruster is off work) to combustion gas generated within the rocket motor. Therefore, a heat resistant structure for securing sealing and material strength of the actuator is required.

An object of the present invention is to provide a combustion gas supply control device that can supply combustion gas to a combustion gas exhaust hole at a desired timing, in a combustion gas generator such as an unseparated thruster type multi-pulse rocket motor.

In an aspect of the present invention, a combustion gas supply control device in a combustion gas generator is provided. The combustion gas generator has: a motor case; a first propellant loaded within the motor case to burn at a first pulse; a second propellant loaded within the motor case to burn at a second pulse subsequent to the first pulse; a front motor head fixed to a front portion of the motor case and having a combustion gas exhaust hole; and a rear motor head fixed to a rear portion of the motor case and having a combustion gas exhaust hole. The combustion gas supply control device prevents combustion gas of the first propellant at the first pulse from flowing into the combustion gas exhaust hole of the front motor head and supplies combustion gas of the second propellant at the second pulse to the combustion gas exhaust hole of the front motor head.

The combustion gas supply control device may have a barrier membrane placed within the motor case to isolate the first propellant and the second propellant from each other. The barrier membrane is placed such that the combustion gas exhaust hole of the front motor head is located on a side of the second propellant and isolated from the first propellant.

The combustion gas supply control device may have: a barrier membrane holding structure placed at the front portion of the motor case and having a combustion gas supply channel through which inside of the motor case and the combustion gas exhaust hole of the front motor head are connected; and a barrier membrane placed within the motor case to isolate the first propellant and the second propellant from each other and fixed to the barrier membrane holding structure. The barrier membrane is placed such that the combustion gas supply channel is located on a side of the second propellant and isolated from the first propellant.

In the combustion gas supply control device, at the second pulse, the barrier membrane is broken and combustion gas of the second propellant is exhausted from both the combustion gas exhaust hole of the front motor head and the combustion gas exhaust hole of the rear motor head.

The combustion gas supply control device may further have an igniter for the second propellant. The igniter may be placed to ignite the second propellant through the combustion gas supply channel. Alternatively, the igniter may be placed at an end surface of the second propellant, and the igniter and a whole of an initial burning surface of the second propellant may be covered by the barrier membrane.

According to the present invention, it is possible to achieve with a simple structure a combustion gas supply control device that can supply combustion gas to a combustion gas exhaust hole at a desired timing, in a combustion gas generator such as an unseparated thruster type multi-pulse rocket motor.

BRIEF DESCRIPTION OF THE DRAWINGS

FIG. 15 is a conceptual diagram showing an example of an operation of the combustion gas generator according to the embodiment of the present invention;

DESCRIPTION OF PREFERRED EMBODIMENTS

Embodiments of the present invention will be described with reference to the attached drawings.

As described above, the inventors of the present application have proposed the useful two-pulse rocket motor, in Patent Document 3 (Japanese Patent No. 4719182) (See FIG. 1 to FIG. 6B). The contents disclosed in Patent Document 3 are incorporated in this specification by reference.

Furthermore, the inventors of the present application have proposed, in a prior application (Japanese Patent Application JP-2011-128031) not yet published, a technique that includes the contents of Patent Document 3 and can improve design flexibility and manufacturability of a multi-pulse rocket motor. The contents disclosed in the prior application not yet published are incorporated in this specification by reference. First of all, the multi-pulse rocket motor described in the prior application not yet published will be described hereinafter.

1. Multi-Pulse Rocket Motor

A basic concept of the prior application not yet published is to "unitize" a section which corresponds to each pulse in a rocket motor as described in Patent Document 3 for example. A unitized section which corresponds to each pulse is hereinafter referred to as a "pulse unit". By connecting (interlocking) a plurality of pulse units in series, it is possible to achieve not only a two-pulse rocket motor as described in Patent Document 3 but also a rocket motor with three or more pulses. As will be described later, introducing the concept of the "pulse unit" makes it possible to improve design flexibility and manufacturability of a multi-pulse rocket motor.

Figure 1:
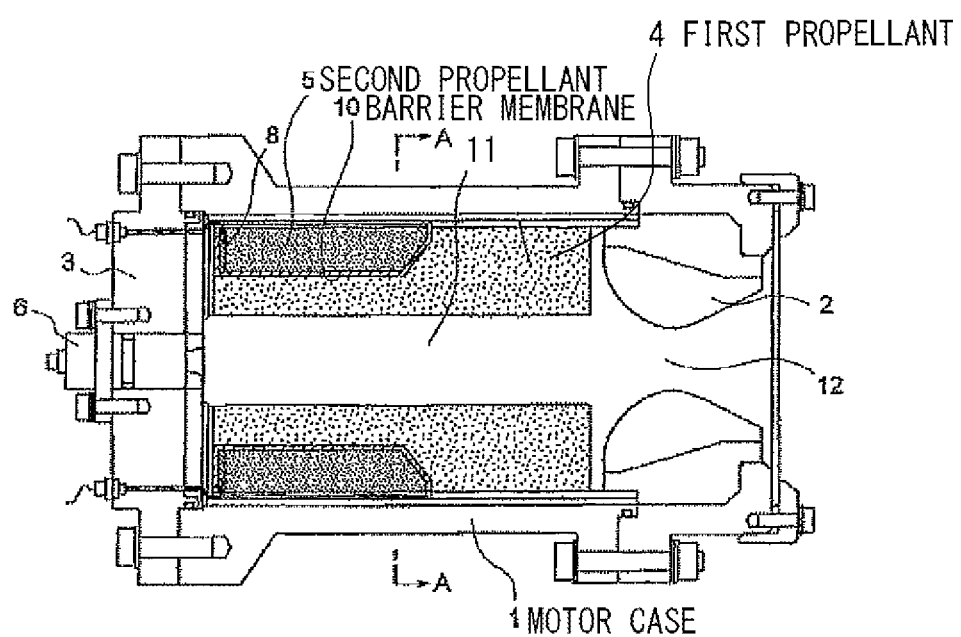
FIG. 1 is a longitudinal sectional view showing an example of a two-pulse rocket motor disclosed in Japanese Patent No. 4719182.
Figure 2:
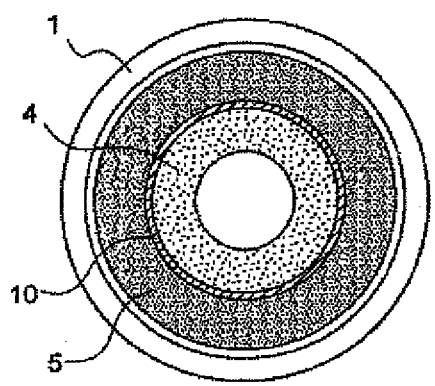
FIG. 2 is a sectional view taken along a line A-A in FIG. 1.
Figure 3:
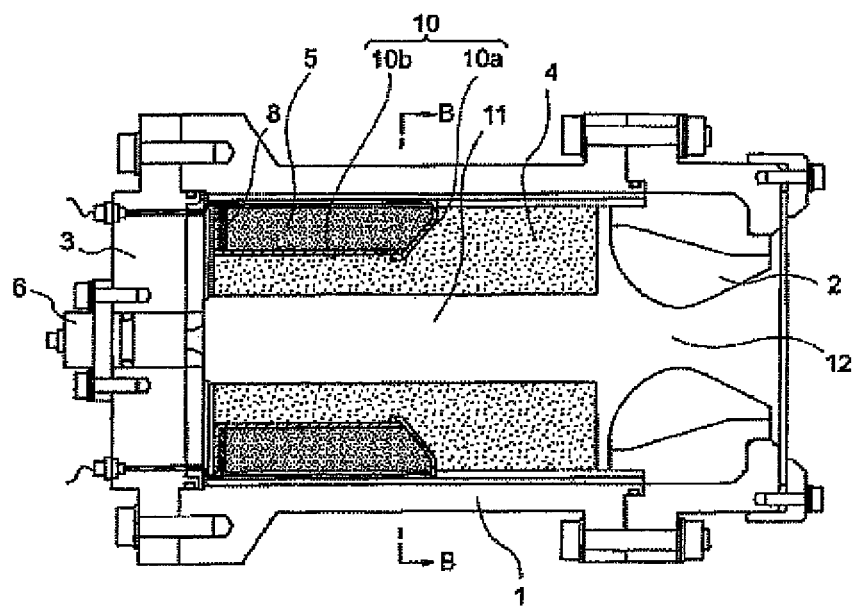
FIG. 3 is a longitudinal sectional view showing another example of a two-pulse rocket motor disclosed in Japanese Patent No. 4719182.
Figure 4:
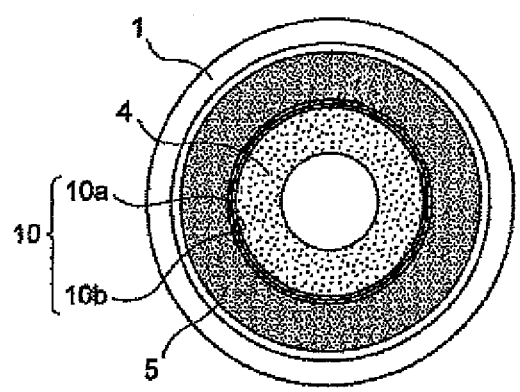
FIG. 4 is a sectional view taken along a line B-B in FIG. 3.
Figure 5:
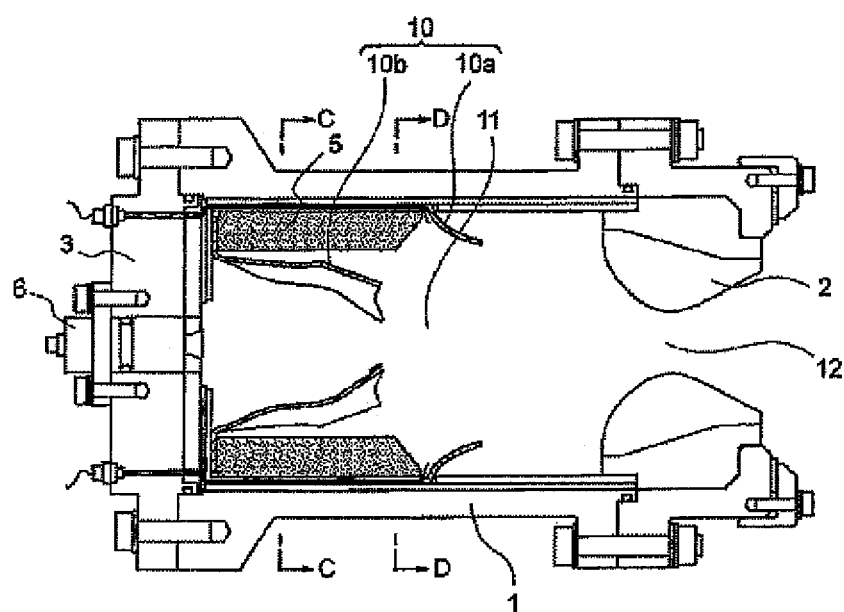
FIG. 5 is a longitudinal sectional view showing a deformation state of a barrier membrane at the time when a second propellant combustions in a configuration shown in FIG. 3.
Figure 6A:
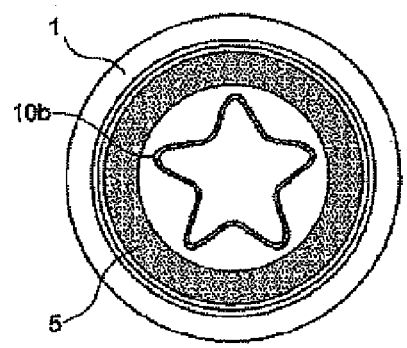
FIG. 6A is a sectional view taken along a line C-C in FIG. 5.
Figure 6B:
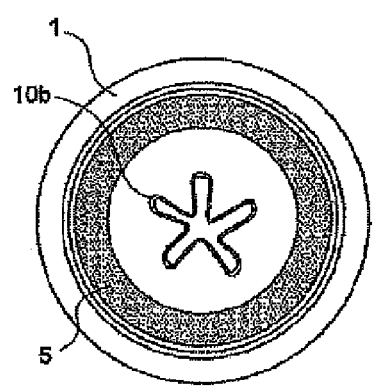
FIG. 6B is a sectional view taken along a line D-D in FIG. 5.
Figure 7:
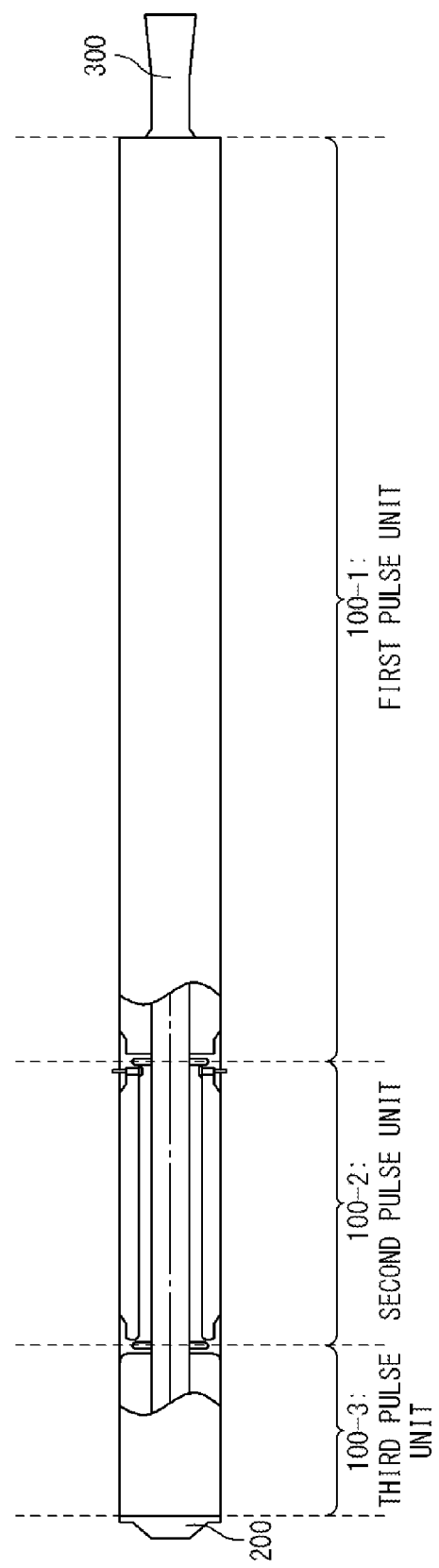
FIG. 7 is a conceptual diagram showing a multi-pulse rocket motor described in a prior application (Japanese Patent Application JP-2011-128031) that was applied by the inventors of the present application and is not yet published.

FIG. 7 is a conceptual diagram showing a multi-pulse rocket motor. The multi-pulse rocket motor has a plurality of pulse units 100, a head unit 200 and a nozzle unit 300. The plurality of pulse units 100 are interlocked (connected) in series. Furthermore, the plurality of pulse units 100 connected in series are sandwiched between the head unit 200 and the nozzle unit 300. In the example shown in FIG. 7, the nozzle unit 300, a first pulse unit 100-1, a second pulse unit 100-2, a third pulse unit 100-3 and the head unit 200 are connected in series in this order from the rear (on the side of the nozzle unit 300) toward the front (on the side of the head unit 200).

Figure 8:
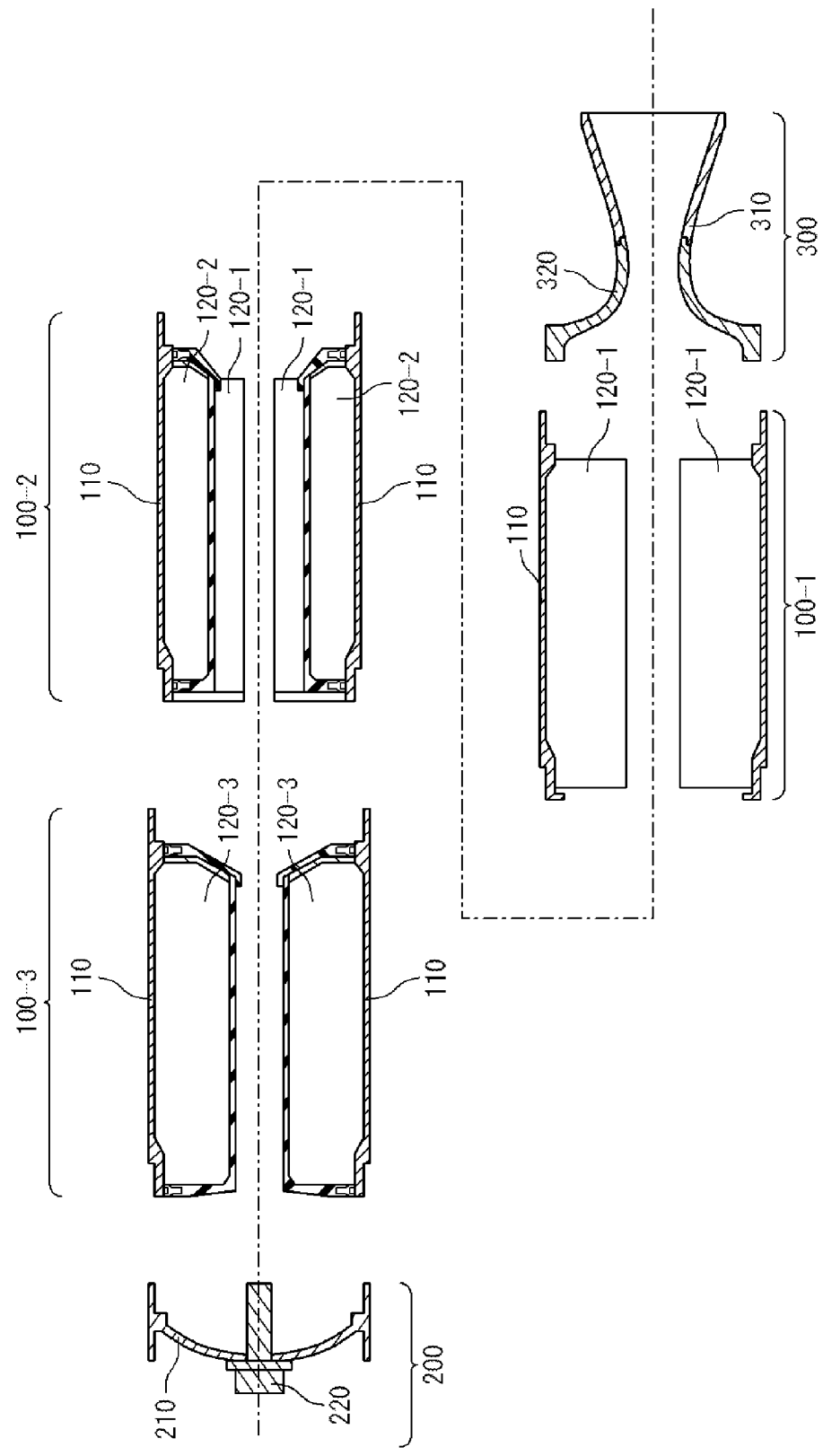
FIG. 8 is a longitudinal sectional view showing unit division of the multi-pulse rocket motor shown in FIG. 7.

FIG. 8 is a longitudinal sectional view showing unit division of the multi-pulse rocket motor shown in FIG. 7.

The first pulse unit 100-1 is a pulse unit corresponding to the first pulse. The first pulse unit 100-1 has a cylindrical motor case 110 and a first propellant 120-1. The first propellant 120-1 is loaded within the motor case 110. The first propellant 120-1 has an internal-burning type shape or an internal-end-burning type shape and a hollow tubular shape.

The second pulse unit 100-2 is a pulse unit corresponding to the second pulse. The second pulse unit 100-2 has a cylindrical motor case 110 and a second propellant 120-2. The second propellant 120-2 is loaded within the motor case 110. The second propellant 120-2 has an internal-burning type shape or an internal-end-burning type shape and a hollow tubular shape.

The third pulse unit 100-3 is a pulse unit corresponding to the third-stage pulse. The third pulse unit 100-3 has a cylindrical motor case 110 and a third propellant 120-3. The third propellant 120-3 is loaded within the motor case 110. The third propellant 120-3 has an internal-burning type shape or an internal-end-burning type shape and a hollow tubular shape.

The head unit 200 has a front motor head 210 and a first igniter 220. The first igniter 220, which is for igniting the first propellant 120-1, is fixed to the front motor head 210 of the head unit 200.

The nozzle unit 300 has a nozzle 310 having an exhaust hole for exhausting combustion gas and a rear motor head 320.

Figure 9:
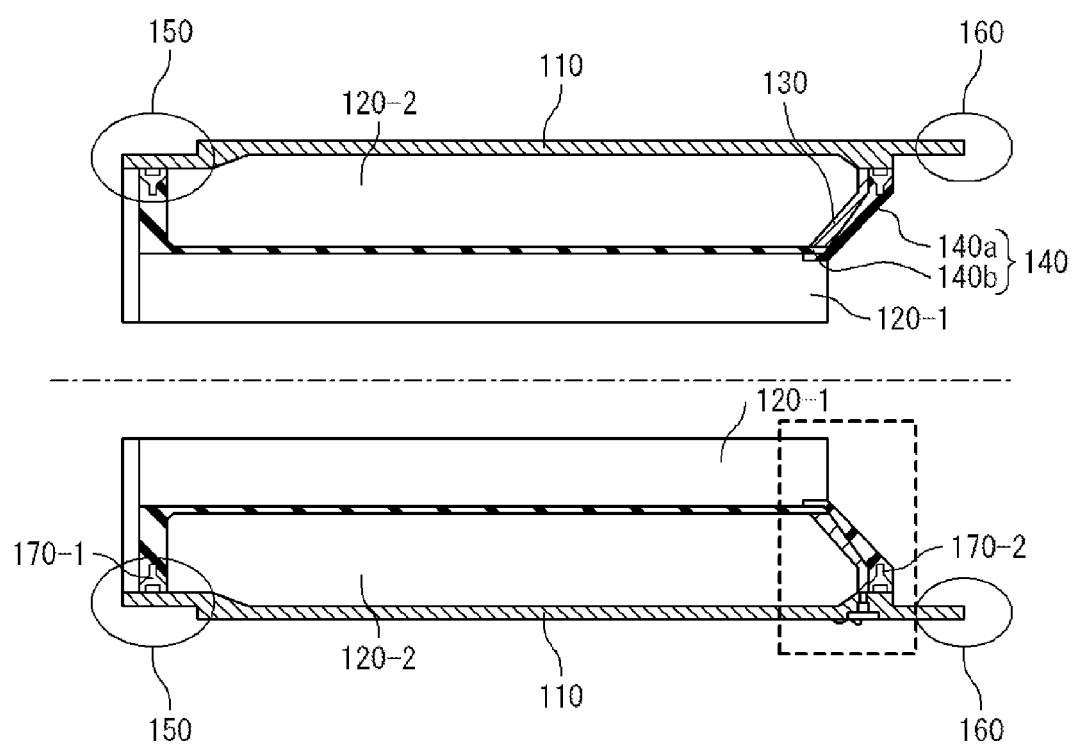
FIG. 9 is a longitudinal sectional view showing a configuration example of a single pulse unit as a component of the multi-pulse rocket motor shown in FIG. 8.
Figure 10:
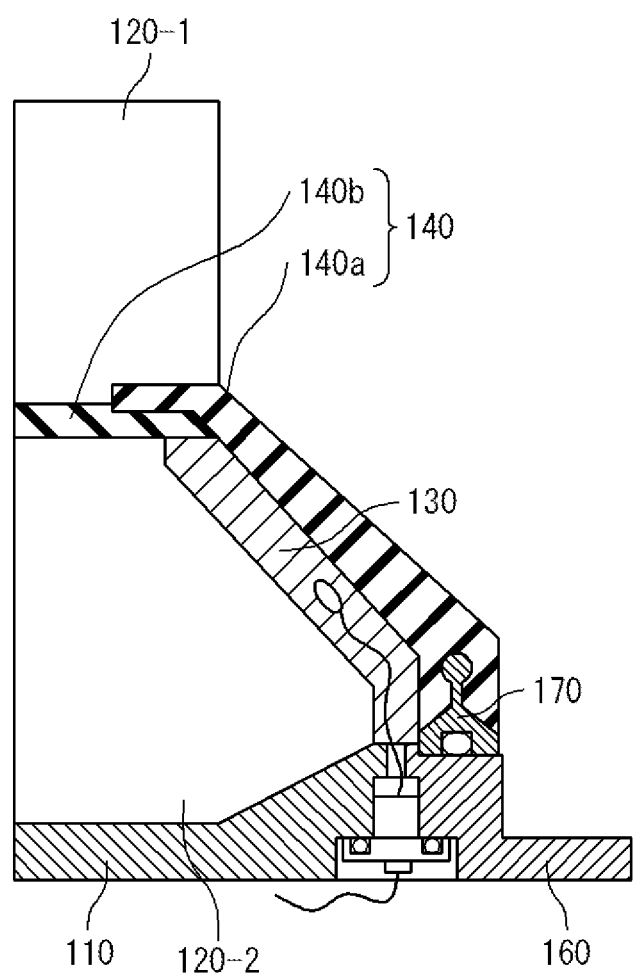
FIG. 10 is an enlarged view of a portion surrounded by a dashed line in FIG. 9.

FIG. 9 shows a configuration example of a single pulse unit 100. FIG. 10 is an enlarged view of a portion surrounded by a dashed line in FIG. 9. Here, a configuration example of the second pulse unit 100-2 will be described as an example.

As shown in FIG. 9, the second pulse unit 100-2 has the cylindrical motor case 110, the second propellant 120-2, an igniter 130, a barrier membrane 140, a forward joint 150 and a rearward joint 160.

The second propellant 120-2 is loaded within the motor case 110. The shape of the second propellant 120-2 is an internal-burning type or an internal-end-burning type.

The igniter 130, which is for igniting the second propellant 120-2, is placed at an end surface of the second propellant 120-2. In the example shown in FIG. 9, the igniter 130 is placed on a rear end surface of the second propellant 120-2. Alternatively, the igniter 130 may be placed on a front end surface of the second propellant 120-2. In either case, late-installation of the igniter 130 is possible.

The barrier membrane 140 is placed so as to cover a whole of an initial burning surface of the second propellant 120-2 and the igniter 130. The barrier membrane 140 makes it possible to protect the second propellant 120-2 and the igniter 130 from heat during combustion of the first pulse.

Furthermore, it is preferable that the barrier membrane 140 is divided into an aft barrier membrane 140a and an inner barrier membrane 140b as in the case of the Patent Document 3. In this case, the aft barrier membrane 140a in a circular truncated cone shape is provided so as to cover the rear surface of the second propellant 120-2. On the other hand, the inner barrier membrane 140b in a tubular shape is provided so as to cover the inner surface of the second propellant 120-2. Respective ends of the aft barrier membrane 140a and the inner barrier membrane 140b are bonded with each other by a fire-resistant adhesive over an entire periphery, to serve as a weak section. The weak section (joint section) is not broken during combustion of the first propellant 120-1 but is certainly broken by pressure of gas generated by operation of the igniter 130 or combustion of the second propellant 120-2.

At the time of combustion of the second propellant 120-2, the inner barrier membrane 140b, which is a large part of the barrier membrane 140, is deformed toward the center of the motor case 110 and is held at the forward portion of the motor case 110 where a combustion gas flow of the second propellant 120-2 is relatively slow. Meanwhile, a break portion of the aft barrier membrane 140a is deformed to be turned up backward along the combustion gas flow. Therefore, breakability and durability of the barrier membrane 140 (the aft barrier membrane 140a and the inner barrier membrane 140b) become clear and certain (see FIG. 5, FIG. 6A, and FIG. 6B). Moreover, when the igniter 130 is placed adjacent to the aft barrier membrane 140a as in the example shown in FIGS. 9 and 10, certainty of breakage of the barrier membrane 140 (the aft barrier membrane 140a and the inner barrier membrane 140b) becomes higher, which is preferable. It should be noted that the same effects as in the case of the above-mentioned divided structure can be obtained even when the barrier membrane 140 is formed integrally and a cutoff line or a notch is provided at a position to be broken.

The forward joint 150 is placed at a forward end of the motor case 110. On the other hand, the rearward joint 160 is placed at a rearward end of the motor case 110. The forward joint 150 is formed so as to be connectable with the rearward joint 160 of another pulse unit 100. On the other hand, the rearward joint 160 is formed so as to be connectable with the forward joint 150 of another pulse unit 100. By using the forward joint 150 and the rearward joint 160, it is possible to interlock (connect) the pulse units 100 one after another.

Moreover, as shown in FIGS. 9 and 10, the second pulse unit 100-2 may be further provided with barrier membrane holders 170 (a first barrier membrane holder 170-1 and a second barrier membrane holder 170-2). Each of the barrier membrane holders 170 is a ring-shaped metallic part having an O-ring groove on its outer periphery. As shown in FIG. 9, the first barrier membrane holder 170-1 and the second barrier membrane holder 170-2 are respectively fixed to the forward joint 150 side and the rearward joint 160 side of the barrier membrane 140. With the barrier membrane holders 170 having the O-rings on its outer periphery, the barrier membrane 140 is mechanically fixed to the motor case 110. As a result, entry of the combustion gas from the burning region into a region partitioned by the barrier membrane 140 (i.e. a region where the second propellant 120-2 and the igniter 130 are provided) is blocked by the O-rings at the time of combustion of the first propellant 120-1.

As shown in FIG. 9, the first propellant 120-1 for the first pulse may be further loaded within the second pulse unit 100-2. In this case, in the second pulse unit 100-2, the first propellant 120-1 is loaded so as to cover the above-mentioned barrier membrane 140. In other words, the first propellant 120-1 and the second propellant 120-2 are isolated from each other by the barrier membrane 140. An inner surface of the first propellant 120-1 is exposed to the burning region. To load the first propellant 120-1 also in the second pulse unit 100-2 in this manner makes it possible to secure a sufficient initial burning area with respect to the first propellant 120-1 (first pulse), as in the case of the Patent Document 3.

It should be noted that the barrier membrane 140 and the igniter 130 are not provided in the first-stage first pulse unit 100-1. As shown in FIG. 8, in the first pulse unit 100-1, the first propellant 120-1 is loaded within the motor case 110 and the inner surface of the first propellant 120-1 is exposed to the burning region. The first igniter 220 for igniting the first propellant 120-1 may be provided at the head unit 200 or may be provided at the rear motor head 320 of the nozzle unit 300.

As in the case of the second pulse unit 100-2, each of the other pulse units 100 has the forward joint 150 and the rearward joint 160. By using the forward joints 150 and the rearward joints 160, it is possible to interlock (connect) the plurality of pulse units 100 in series.

Figure 11:
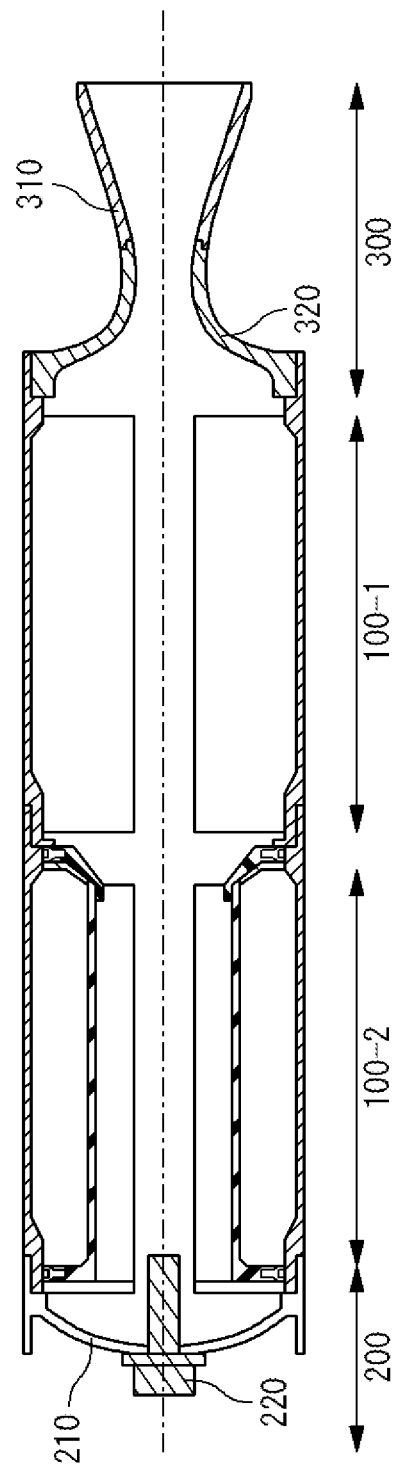
FIG. 11 is a longitudinal sectional view showing a configuration example of a two-pulse rocket motor using the pulse units shown in FIGS. 8 and 9.

FIG. 11 shows a configuration example of a two-pulse rocket motor utilizing the pulse units 100. The forward joint 150 of the first pulse unit 100-1 is connected with the rearward joint 160 of the second pulse unit 100-2. The rearward joint 160 of the first pulse unit 100-1 is connected with the nozzle unit 300. The forward joint 150 of the second pulse unit 100-2 is connected with the head unit 200. In this manner, a two-pulse rocket motor as described in Patent Document 3 can be easily achieved by using the pulse units 100.

It should be noted that the first barrier membrane holder 170-1 of the pulse unit 100 connected to the head unit 200 may be mechanically fixed to the front motor head 210 or the first igniter 220.

As described above, a section which corresponds to each pulse of the multi-pulse rocket motor is provided as the pulse unit 100. It is possible to achieve a desired rocket motor performance by connecting a desired number of the pulse units 100. That is to say, design flexibility of the multi-pulse rocket motor is improved.

Also, each pulse unit 100 is short in length, which is advantageous in portability at the time of manufacturing. Moreover, it is possible to reduce a manufacturing period by manufacturing a plurality of pulse units 100 in parallel.

Furthermore, late-installation of the igniter 130 and the barrier membrane 140 is possible, which makes it possible to directly load the propellant 120 into each pulse unit 100. As a result, a high filling rate of the propellant 120 can be achieved. As a comparative example, let us consider the two-pulse rocket motor shown in FIGS. 1 and 3. In the case of the comparative example, no pulse unit is utilized and thus it is necessary to form at least one of the first propellant 4 and the second propellant 5 outside and insert the formed propellant into the motor case. In this case, however, a gap is inevitably caused between the formed propellant and the motor case, because an inner diameter of the inner shape of the motor case is usually smaller at the both ends than at the center portion. This means deterioration of a filling rate of the propellant. According to the present embodiment, the pulse unit 100 corresponding to each pulse is independently formed, which makes it possible to directly load the propellant 120 into each pulse unit 100. As a result, a high filling rate of the propellant 120 can be achieved.

2. Combustion Gas Supply Control Device

Next, a "combustion gas supply control device" according to an embodiment of the present invention will be described. The combustion gas supply control device is a mechanism for supplying combustion gas of propellant to a combustion gas exhaust hole at a desired timing. The combustion gas supply control device is applicable to the two-pulse rocket motor (see FIGS. 1 to 6B) described in the Patent Document 3 (Japanese Patent No. 4719182), the multi-pulse rocket motor (see FIGS. 7 to 11) described in the prior application (Japanese Patent Application JP-2011-128031) not yet published, a combustion gas generator and so on.

As an example, let us describe the combustion gas supply control device according to the present embodiment by using the configuration of the multi-pulse rocket motor shown in FIGS. 7 to 11 as a base. The same reference numerals are given to the same components as shown in FIGS. 7 to 11, and an overlapping description will be omitted as appropriate. It should be noted that the combustion gas supply control device according to the present embodiment can be applied to other cases in a similar manner.

Figure 12:
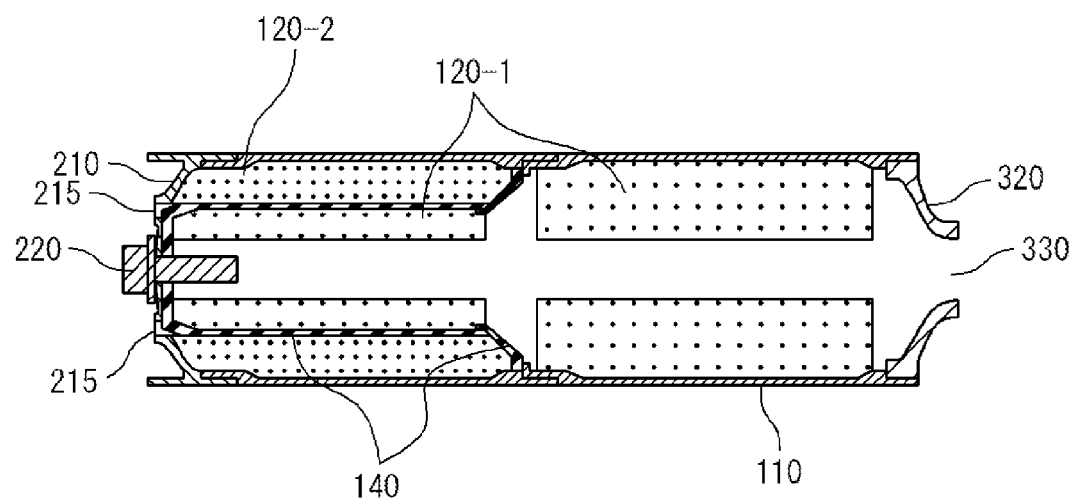
FIG. 12 is a longitudinal sectional view schematically showing a configuration example of a combustion gas generator according to an embodiment of the present invention.
Figure 13:
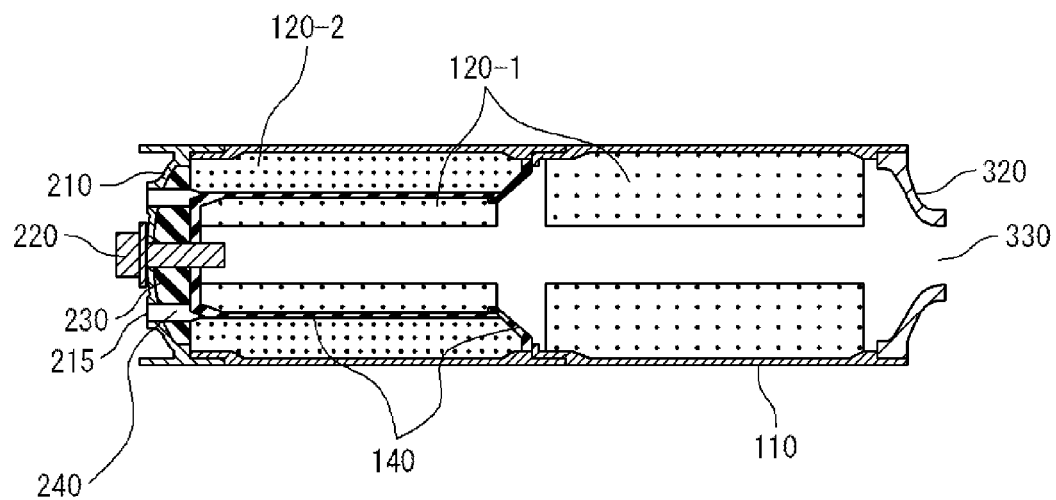
FIG. 13 is a longitudinal sectional view schematically showing a configuration example of a combustion gas generator according to an embodiment of the present invention.

FIGS. 12 and 13 schematically show a configuration example of the combustion gas generator according to the present embodiment. The combustion gas generator shown in FIGS. 12 and 13 has a configuration in which the nozzle 310 is omitted from the two-pulse rocket motor shown in the foregoing FIG. 11. The rear motor head 320 fixed to the rear portion of the motor case 110 has a combustion gas exhaust hole 330.

Furthermore, in the combustion gas generator shown in FIGS. 12 and 13, the front motor head 210 fixed to the front portion of the motor case 110 has a combustion gas exhaust hole 215. As shown in FIGS. 12 and 13, the combustion gas exhaust hole 215 is connected to the inside of the motor case 110, particularly to a burning region of the second propellant 120-2. The barrier membrane 140 is placed within the motor case 110 to isolate the first propellant 120-1 and the second propellant 120-2 from each other, as described above. Accordingly, the barrier membrane 140 plays a role of locating the combustion gas exhaust hole 215 of the front motor head 210 on the side of the second propellant 120-2 and isolating the combustion gas exhaust hole 215 of the front motor head 210 from the first propellant 120-1.

As shown in FIG. 13, a barrier membrane holding structure 230 may be placed at the front portion of the motor case 110. More specifically, the barrier membrane holding structure 230 is placed between the front motor head 210 and the barrier membrane 140, and a front end of the barrier membrane 140 is fixed to the barrier membrane holding structure 230. The barrier membrane holding structure 230 is made of insulator material such as fiber reinforced plastics (FRP). Moreover, the barrier membrane holding structure 230 has a combustion gas supply channel 240 connecting between the combustion gas exhaust hole 215 and the burning region of the second propellant 120-2. The barrier membrane holding structure 230 connects between the inside of the motor case 110 and the combustion gas exhaust hole 215 through the combustion gas supply channel 240. In this case, the barrier membrane 140 plays a role of locating the combustion gas supply channel 240 on the side of the second propellant 120-2 and isolating the combustion gas supply channel 240 from the first propellant 120-1.

Figure 14:
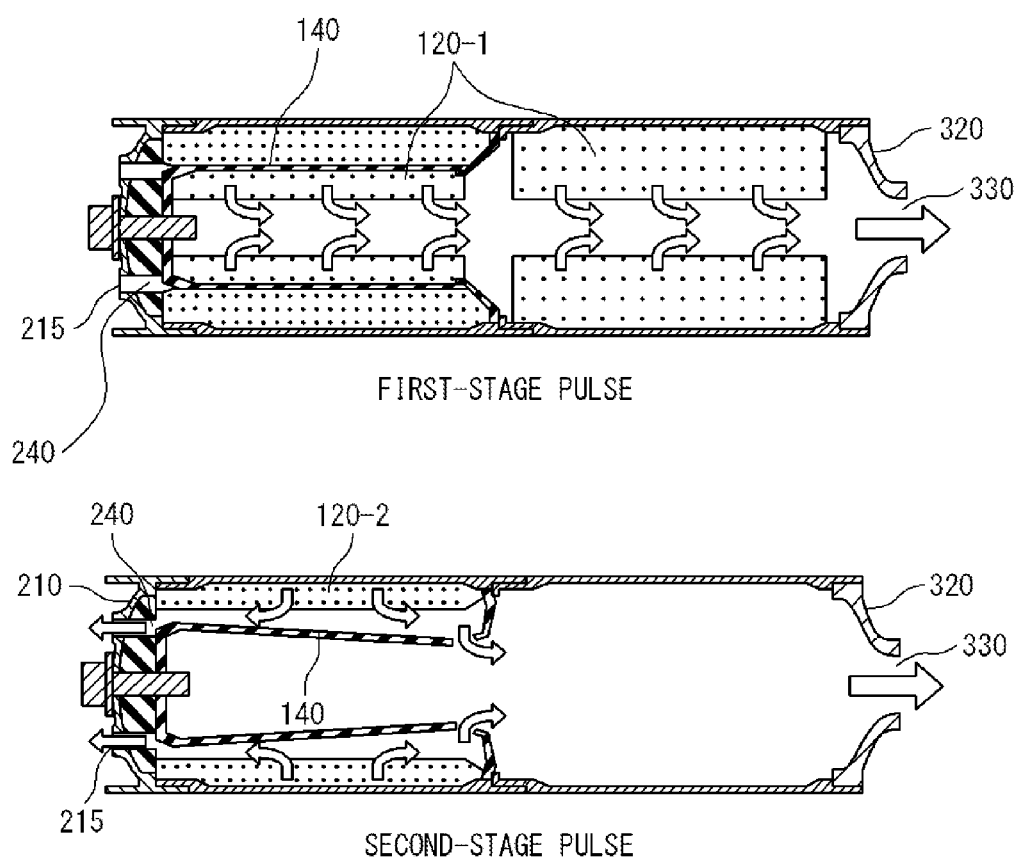
FIG. 14 is a conceptual diagram showing a function of a combustion gas supply control device in the combustion gas generator according to the embodiment of the present invention.

An operation of the combustion gas generator shown in FIG. 13 will be described with reference to FIG. 14. At the first pulse, the first propellant 120-1 burns. At this time, the barrier membrane 140 prevents the combustion gas of the first propellant 120-1 from flowing into the combustion gas supply channel 240 and the combustion gas exhaust hole 215. The combustion gas of the first propellant 120-1 flows toward the rear motor head 320 and is exhausted from the combustion gas exhaust hole 330.

The second pulse starts after a certain period of time has passed from completion of combustion of the first propellant 120-1. At the second pulse, the second propellant 120-2 burns. At this time, the weak section (joint section) of the barrier membrane 140 is broken, and the combustion gas of the second propellant 120-2 flows toward the rear motor head 320 and is exhausted from the combustion gas exhaust hole 330. At the same time, the combustion gas of the second propellant 120-2 flows into the forward combustion gas supply channel 240 and thus is exhausted from the combustion gas exhaust hole 215 of the front motor head 210 as well.

As described above, the forward combustion gas exhaust hole 215 is connected to the burning region of the second propellant 120-2 and isolated from the first propellant 120-1 by the barrier membrane 140. Therefore, at the first pulse, the combustion gas of the first propellant 120-1 is prevented from flowing into the forward combustion gas exhaust hole 215. Whereas at the second pulse, the combustion gas of the second propellant 120-2 is exhausted from the forward combustion gas exhaust hole 215. It can be said that the barrier membrane 140 in the present embodiment serves as a "combustion gas supply control device" that prevents the combustion gas of the first propellant 120-1 at the first pulse from flowing into the combustion gas exhaust hole 215 and supplies the combustion gas of the second propellant 120-2 at the second pulse to the combustion gas exhaust hole 215. It should be noted here that there is no need to provide a mechanical movable mechanism and the combustion gas supply control device can be achieved with a simple structure. Moreover, since the barrier membrane 140 made of a rubber material is used as the combustion gas supply control device, reduction in weight can be achieved.

FIG. 15 shows a case where the igniter 130 shown in the foregoing FIGS. 9 and 10 is used as the second igniter for igniting the second propellant 120-2. The operation at the second pulse in this case is the same as described above.

Figure 16:
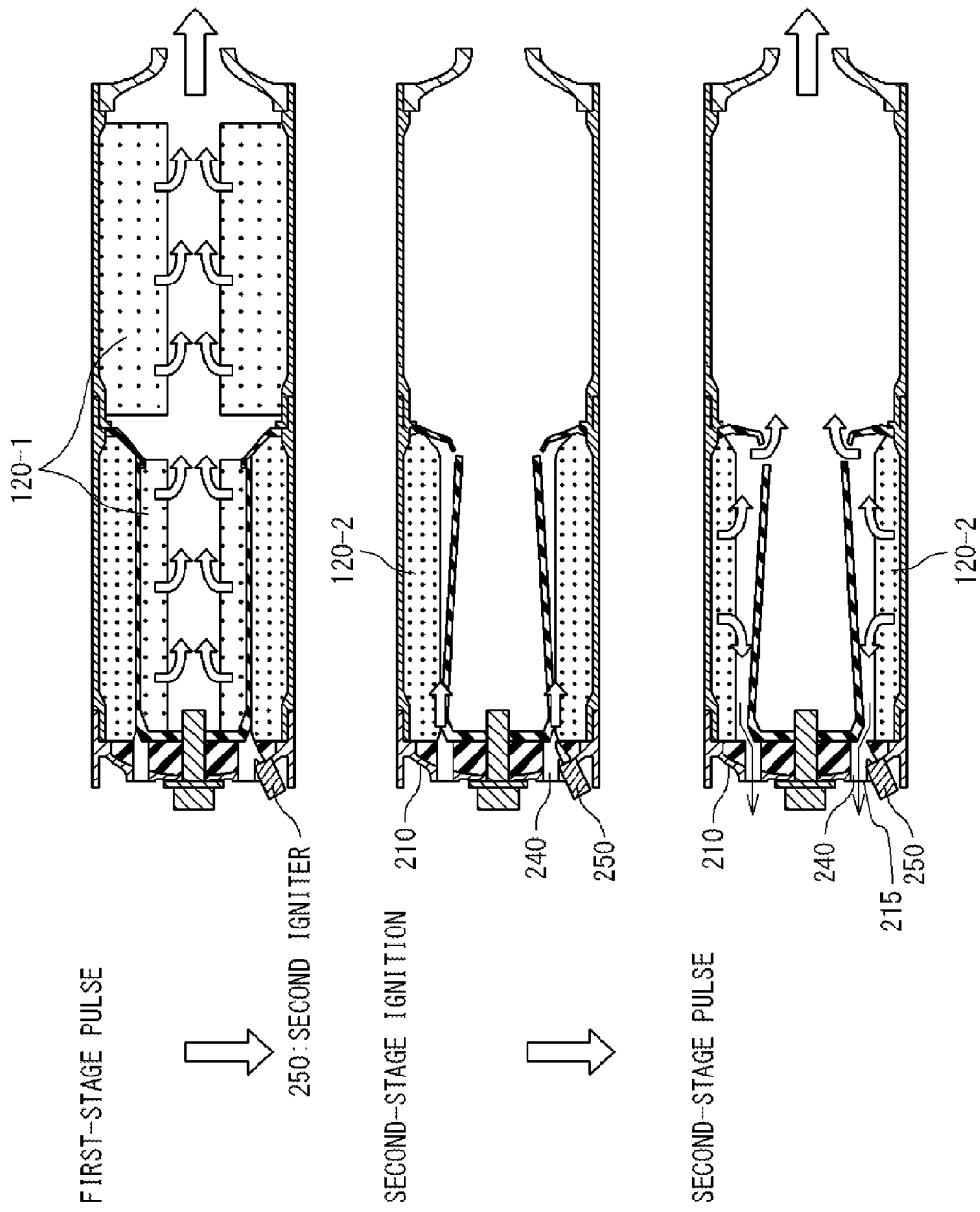
FIG. 16 is a conceptual diagram showing another example of an operation of the combustion gas generator according to the embodiment of the present invention.

FIG. 16 shows a modification example related to the second igniter for igniting the second propellant 120-2. According to the present modification example, a second igniter 250 is provided instead of the above-mentioned igniter 130. The second igniter 250 is placed so as to ignite the second propellant 120-2 through the above-mentioned combustion gas supply channel 240. More specifically, the second igniter 250 is fixed to the front motor head 210 and exhausts combustion gas for ignition to the combustion gas supply channel 240. The combustion gas exhausted from the second igniter 250 is supplied to the second propellant 120-2 through the combustion gas supply channel 240 and thus the second propellant 120-2 starts burning. That is, according to the present modification example, the combustion gas supply channel 240 is used not only for supplying the combustion gas to the forward combustion gas exhaust hole 215 but also for igniting the second propellant 120-2. In this manner, the combustion gas supply channel 240 is utilized effectively, which is preferable.

Figure 17:
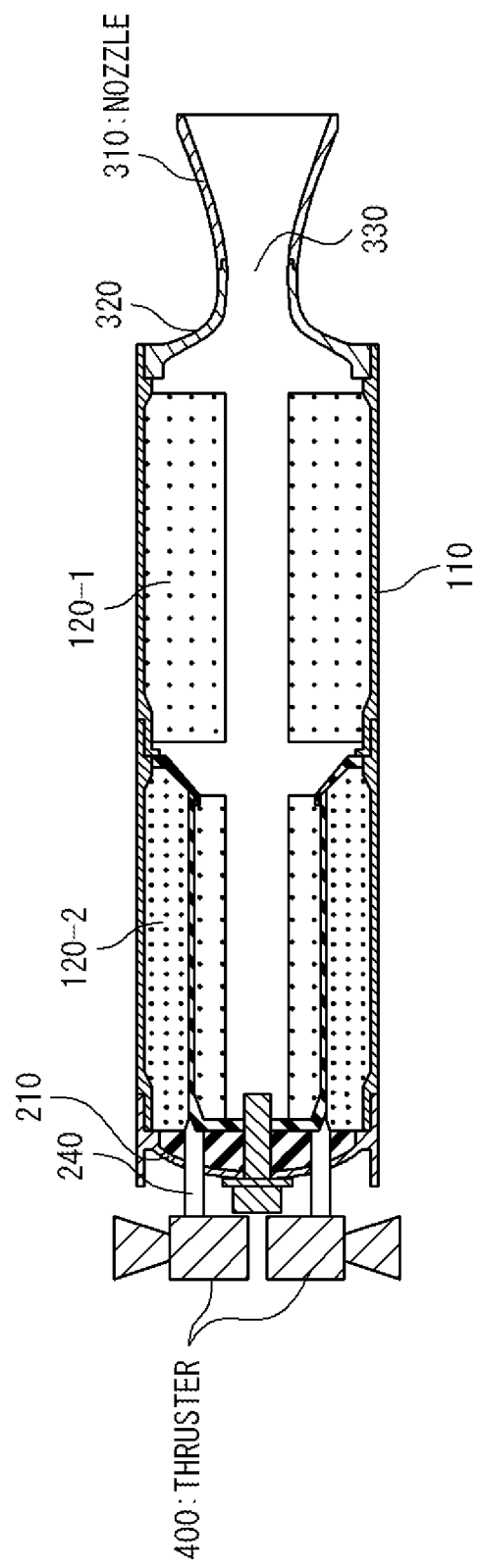
FIG. 17 is a schematic diagram showing a configuration in a case where the combustion gas generator according to the embodiment of the present invention is applied to an unseparated thruster type multi-pulse rocket motor.

FIG. 17 is a schematic diagram showing a configuration in a case where the combustion gas generator according to the present embodiment is applied to an unseparated thruster type multi-pulse rocket motor. The nozzle 310 is fixed to the rear motor head 320. Moreover, a thruster 400 is fixed on the front side of the front motor head 210 through the combustion gas supply channel 240. The thruster 400 receives the combustion gas from the inside of the motor case 110 through the combustion gas supply channel 240 and exhausts the combustion gas to the outside of the motor case 110 with controlling its flow rate by actuator.

According to the present embodiment, the combustion gas of the first propellant 120-1 is prevented from flowing into the thruster 400 at the first pulse. That is, the thruster 400 is not exposed to the combustion gas during the first pulse. Therefore, there is no need to heat-protect the actuator of the thruster 400 at the first pulse when the thruster 400 is off work. Whereas at the second pulse, the combustion gas of the second propellant 120-2 flows into the thruster 400 through the combustion gas supply channel 240. That is to say, the combustion gas is supplied to the thruster 400 at a desired timing when the thruster 400 needs to be operated. In this manner, it is possible to supply the combustion gas to the thruster 400 at a desired timing by using the simple combustion gas supply control device according to the present embodiment.

Figure 18:
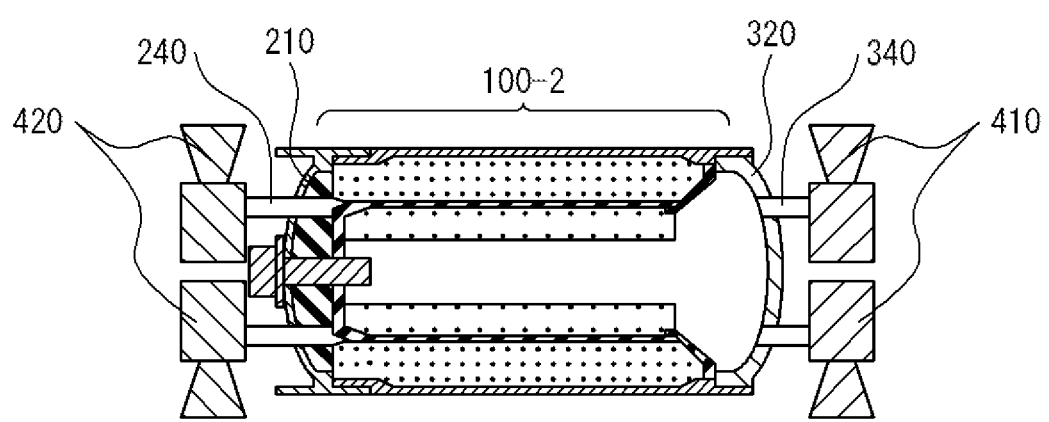
FIG. 18 is a schematic diagram showing a configuration in a case where the combustion gas generator according to the embodiment of the present invention is applied to a multi-pulse gas generator.

FIG. 18 is a schematic diagram showing a configuration in a case where the combustion gas generator according to the present embodiment is applied to a multi-pulse gas generator. In the present example, the rear motor head 320 is fixed to a rear portion of the second pulse unit 100-2. A rear thruster 410 is fixed on the rear side of the rear motor head 320 through a combustion gas supply channel 340. Also, a front thruster 420 is fixed on the front side of the front motor head 210 through the combustion gas supply channel 240. In the case of this configuration, at the first pulse, the combustion gas is supplied to the rear thruster 410 but not to the front thruster 420. At the second pulse, the combustion gas is supplied to both the rear thruster 410 and the front thruster 420.

The present embodiment of the present invention has been described above by referring to the attached drawings. However, the present invention is not limited to the embodiment, and can be properly changed by those skilled in the art without departing from the scope of the invention.

What is claimed is:

1. A combustion gas supply control device in a combustion gas generator,
    said combustion gas generator comprising:
    a motor case;
    a first propellant loaded within said motor case to burn at a first pulse;
    a second propellant loaded within said motor case to burn at a second pulse subsequent to said first pulse;
    a front motor head fixed to a front portion of said motor case and having a combustion gas exhaust hole; and
    a rear motor head fixed to a rear portion of said motor case and having a combustion gas exhaust hole,
    wherein said combustion gas supply control device is configured to prevent combustion gas of said first propellant at said first pulse from flowing into said combustion gas exhaust hole of said front motor head and is configured to supply combustion gas of said second propellant at said second pulse to said combustion gas exhaust hole of said front motor head, and
    wherein said combustion gas exhaust hole of said front motor head is configured to exhaust said combustion gas of said second propellant separately from said combustion gas exhaust hole of said rear motor head.

2. The combustion gas supply control device according to claim 1, further comprising a barrier membrane disposed within said motor case to isolate said first propellant and said second propellant from each other,
    wherein said barrier membrane is disposed such that said combustion gas exhaust hole of said front motor head is located on a side of said second propellant and isolated from said first propellant.

3. The combustion gas supply control device according to claim 1, further comprising:
    a barrier membrane holding structure disposed at the front portion of said motor case and having a combustion gas supply channel through which an inside of said motor case and said combustion gas exhaust hole of said front motor head are connected; and
    a barrier membrane disposed within said motor case to isolate said first propellant and said second propellant from each other and fixed to said barrier membrane holding structure,
    wherein said barrier membrane is disposed such that said combustion gas supply channel is located on a side of said second propellant and isolated from said first propellant.

4. The combustion gas supply control device according to claim 2,
    wherein, at said second pulse, said barrier membrane is configured to break and both said combustion gas exhaust hole of said front motor head and said combustion gas exhaust hole of said rear motor head are configured to exhaust said combustion gas of said second propellant.

5. The combustion gas supply control device according to claim 3, wherein, at said second pulse, said barrier membrane is configured to break and both said combustion gas exhaust hole of said front motor head and said combustion gas exhaust hole of said rear motor head are configured to exhaust said combustion gas of said second propellant.

6. The combustion gas supply control device according to claim 2, further comprising an igniter for said second propellant, wherein said igniter is disposed at an end surface of said second propellant, and said igniter and a whole of an initial burning surface of said second propellant are covered by said barrier membrane.

7. The combustion gas supply control device according to claim 3, further comprising an igniter for said second propellant, wherein said igniter is disposed at an end surface of said second propellant, and said igniter and a whole of an initial burning surface of said second propellant are covered by said barrier membrane.

8. A combustion gas supply control device in a combustion gas generator, said combustion gas generator comprising:
a motor case;
a first propellant loaded within said motor case to burn at a first pulse;
a second propellant loaded within said motor case to burn at a second pulse subsequent to said first pulse;
a front motor head fixed to a front portion of said motor case and having a combustion gas exhaust hole; and
a rear motor head fixed to a rear portion of said motor case and having a combustion gas exhaust hole,
wherein said combustion gas supply control device is configured to prevent combustion gas of said first propellant at said first pulse from flowing into said combustion gas exhaust hole of said front motor head and is configured to supply combustion gas of said second propellant at said second pulse to said combustion gas exhaust hole of said front motor head, and
wherein said combustion gas exhaust hole of said front motor head is configured to exhaust said combustion gas of said second propellant in a first direction and said combustion gas exhaust hole of said rear motor head is configured to exhaust said combustion gas of said second propellant in a second direction, the second direction being different from the first direction.

9. The combustion gas supply control device according to claim 8, further comprising a barrier membrane disposed within said motor case to isolate said first propellant and said second propellant from each other, wherein said barrier membrane is disposed such that said combustion gas exhaust hole of said front motor head is located on a side of said second propellant and isolated from said first propellant.

10. The combustion gas supply control device according to claim 8, further comprising:

a barrier membrane holding structure disposed at the front portion of said motor case and having a combustion gas supply channel through which an interior of said motor case and said combustion gas exhaust hole of said front motor head are connected; and a barrier membrane disposed within said motor case to isolate said first propellant and said second propellant from each other and fixed to said barrier membrane holding structure, wherein said barrier membrane is disposed such that said combustion gas supply channel is located on a side of said second propellant and isolated from said first propellant.

11. The combustion gas supply control device according to claim 9, wherein, at said second pulse, said barrier membrane is configured to break and both said combustion gas exhaust hole of said front motor head and said combustion gas exhaust hole of said rear motor head are configured to exhaust said combustion gas of said second propellant.

12. The combustion gas supply control device according to claim 10, wherein, at said second pulse, said barrier membrane is configured to break and both said combustion gas exhaust hole of said front motor head and said combustion gas exhaust hole of said rear motor head are configured to exhaust said combustion gas of said second propellant.

13. The combustion gas supply control device according to claim 10, further comprising an igniter for said second propellant, wherein said igniter is disposed to ignite said second propellant through said combustion gas supply channel.

14. The combustion gas supply control device according to claim 9, further comprising an igniter for said second propellant, wherein said igniter is disposed at an end surface of said second propellant, and said igniter and a whole of an initial burning surface of said second propellant are covered by said barrier membrane.

15. The combustion gas supply control device according to claim 10, further comprising an igniter for said second propellant, wherein said igniter is disposed at an end surface of said second propellant, and said igniter and a whole of an initial burning surface of said second propellant are covered by said barrier membrane.

16. A combustion gas supply control device in a combustion gas generator, said combustion gas generator comprising:
a motor case;
a first propellant loaded within said motor case to burn at a first pulse;
a second propellant loaded within said motor case to burn at a second pulse subsequent to said first pulse;
a front motor head fixed to a front portion of said motor case and having a combustion gas exhaust hole; and
a rear motor head fixed to a rear portion of said motor case and having a combustion gas exhaust hole,
wherein said combustion gas supply control device is configured to prevent combustion gas of said first propellant at said first pulse from flowing into said combustion gas exhaust hole of said front motor head and is configured to supply combustion gas of said second propellant at said second pulse to said combustion gas exhaust hole of said front motor head,
wherein said combustion gas supply control device comprises an igniter for said second propellant; a barrier membrane holding structure disposed at the front portion of said motor case and having a combustion gas supply channel through which an inside of said motor case and said combustion gas exhaust hole of said front motor head are connected; and a barrier membrane disposed within said motor case to isolate said first propellant and said second propellant from each other and fixed to said barrier membrane holding structure, wherein said igniter is disposed to ignite said second propellant through said combustion gas supply channel, and wherein said barrier membrane is disposed such that said combustion gas supply channel is located on a side of said second propellant and isolated from said first propellant.

* * * * *